United States Patent
Tsao et al.

[11] Patent Number: 5,820,264
[45] Date of Patent: Oct. 13, 1998

[54] TYMPANIC THERMOMETER ARRANGEMENT

[75] Inventors: Simon Tsao; Jin-Shown Shie; James Huang; Clark Liang; San Bao Lin; Mang Ou-Yang; Jerry You, all of Hsin-Chu, Taiwan

[73] Assignees: Oriental System Technology, Inc.; Opto Tech Corporation; Metrodyne Co., Ltd., all of Hsinchu, Taiwan

[21] Appl. No.: 805,435

[22] Filed: Feb. 25, 1997

Related U.S. Application Data

[60] Provisional application No. 60/014,069, Mar. 25, 1996.

[51] Int. Cl.⁶ ............................. G01J 5/08; A61B 6/00
[52] U.S. Cl. ..................... 374/131; 600/474; 600/549; 385/146
[58] Field of Search ..................... 374/131; 128/664; 385/146; 600/549, 474

[56] References Cited

U.S. PATENT DOCUMENTS

| | | | |
|---|---|---|---|
| 3,535,016 | 10/1970 | Malifaud | 385/146 |
| 4,408,827 | 10/1983 | Guthrie et al. | 374/131 |
| 4,813,765 | 3/1989 | Negishi | 385/146 |
| 4,932,789 | 6/1990 | Egawa et al. | 374/131 |
| 5,167,235 | 12/1992 | Seacord et al. | 374/131 |
| 5,271,077 | 12/1993 | Brockman et al. | 385/146 |
| 5,657,408 | 8/1997 | Ferm et al. | 385/146 |

FOREIGN PATENT DOCUMENTS

| | | | |
|---|---|---|---|
| 1165108 | 3/1964 | Germany | 385/146 |
| 8200518 | 2/1982 | WIPO | 374/131 |
| 9007800 | 7/1990 | WIPO | 385/146 |

*Primary Examiner*—Diego F.F. Gutierrez
*Attorney, Agent, or Firm*—Cushman Darby & Cushman IP Group of Pillsbury Madison & Sutro, LLP

[57] ABSTRACT

A waveguide for tympanic thermometer formed by an elongate hollow member having substantially ellipsoidal shape truncated at both ends along its major axis direction. The waveguide is interposed between a tympanic membrane of which the temperature is to be measured and an infrared radiation sensor so as to guide the infrared radiation from the tympanic membrane to the sensor. Alternatively, the waveguide may also be a hollow member including an end portion having a gradually reduced inner diameter toward the side of sensor. The gradually reduced end portion is preferably of a truncated half ellipsoidal shape having a length between about 1/10 to about 1/3 of the distance from the sensor to the distal end of the waveguide.

1 Claim, 16 Drawing Sheets

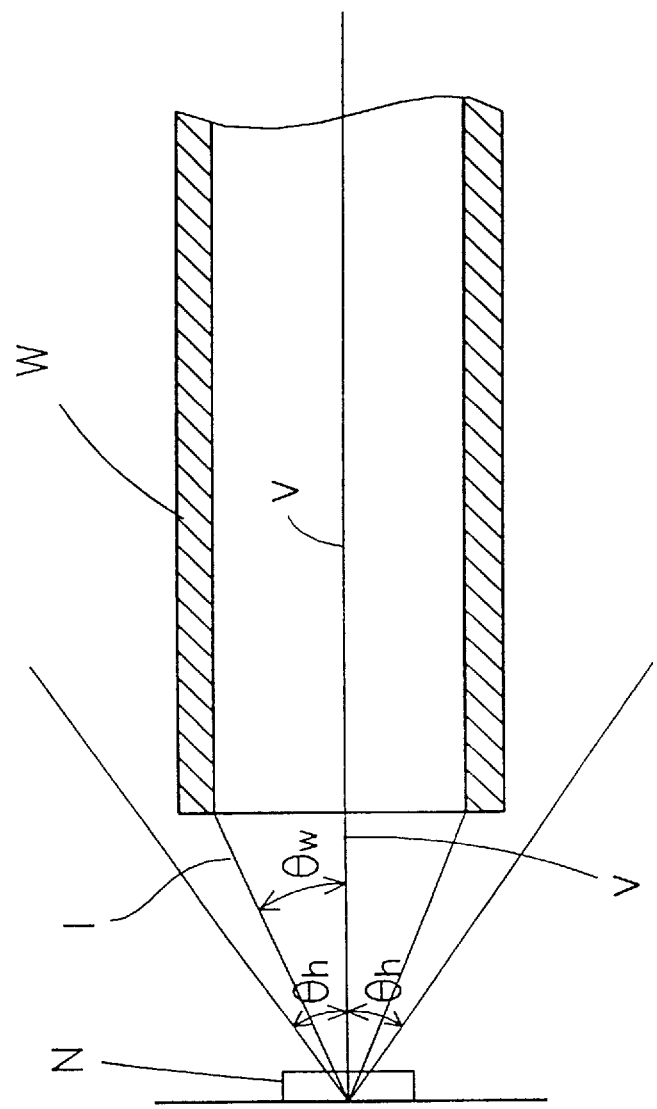

TYMPANIC THERMOMETER ARRANGEMENT

CROSS REFERENCE TO RELATED APPLICATIONS

Both this application and a copending patent application Ser. No. 08/738,646 filed on Oct. 30, 1996 are regular patent applications claiming priority based on U.S. Provisional Patent Application No. 60/014,069 filed Mar. 25, 1996.

BACKGROUND OF THE INVENTION

1. Field of the Invention

This invention relates to a waveguide for tympanic thermometer. The waveguide is interposed between a tympanic membrane of which the temperature is to be measured and a infrared radiation sensor of the tympanic thermometer so as to guide the infrared radiation from the tympanic membrane to the sensor.

2. Technical Background

First, the basic principle for measuring the temperature of a target, such as a tympanic membrane, by sensing infrared radiation therefrom is described as follows.

When an infrared sensor receives infrared radiation from a target, it will generate an electrical signal which is representative of two temperatures—the temperature of the sensor $T_s$, and the temperature of the target Tt. The relationship among these temperatures and the response electrical signal of the sensor can be expressed by Stefan-Boltzmann Law as follows:

$$Vdet = k\epsilon_t\epsilon_s(T_t^4 - T_s^4) \tag{a}$$

where Vdet is the response electrical signal of the sensor, $\epsilon_t$ and $\epsilon_s$ are emissivities of the target and sensor respectively, and k is a constant mainly depending on optical coupling.

If a waveguide, interposed between the target and the sensor, has a temperature different from the temperature of sensor, then heat exchange due to radiation between the target and the sensor, which may be evaluated by the above Stefan-Boltzmann Law, must also be taken into consideration so as to accurately measure the target temperature.

The ultimate goal of infrared temperature measurement as in an infrared tympanic thermometer is to determine the temperature of the target $T_t$. It can be found from equation (a), that to calculate $T_t$, one must first determine two numbers, the reading Vdet of the response electrical signal from the infrared sensor, and the temperature of the sensor $T_s$.

Infrared radiation from a target is usually guided to an infrared sensor by use of an optical system (a waveguide) interposed therebetween. In order to accurately measure the signal Vdet, infrared radiation coming from the target and reaching the infrared sensor must be definite and undisturbed. If the waveguide has a temperature different from the temperature of the sensor, then heat exchange by radiation between the target and the sensor, which may be evaluated by the above Stefan-Boltzmann Law, must also be taken into consideration so as to accurately measure the target temperature. Consequently, the following requirements must be met for an accurate infrared radiation thermometry:

(1) Infrared radiation coming from the target through the interposed optical system is received as much as possible by the sensor;

(2) Infrared radiation received by the sensor substantially exclusively originates from the target (for example a tympanic membrane) per se rather than from its surrounding (for example a ear canal)

(3) Stray radiation emitted from the waveguide of the thermometry system, which has a temperature different from the temperature of the sensor $T_s$, must be reduced to minimum or its effect must be properly evaluated in determining the target temperature.

Therefore, in order to meet the above requirement (1) in the measurement of a target temperature, the number of reflections of the infrared radiation coming from the target by the interposed optical system, if which is a reflection type (e.g. a tubular waveguide coated with gold in its inner surface), before reaching the sensor must be reduced to minimum.

Besides, in order to meet the above requirement (2), the percentage of infrared radiation coming from the surrounding (e.g. an ear canal) of the target (e.g. a tympanic membrane) among the total infrared radiation received by the sensor, which will affect the accuracy in the measurement of the target temperature, must also be reduced to minimum. For properly evaluating the above percentage, a concept hereinafter referred to as "system FOV" (Field of View) of the thermometry system together with a related technique hereinafter referred to as "Ray Tracing" for analyzing the system FOV of an interposed optical system is introduced now.

"Ray Tracing" is performed by tracing, through the optical system interposed between the sensor and the target, along a plurality of incident infrared rays coming from all possible angular range and received by the sensor N in the reverse directions of the incident infrared rays so as to find the sources from which the received infrared rays are originated. According to the results of "Ray Tracing" (see FIGS. 1B, 2, 3, 4, 5B and 6B), we can find the trace of each infrared ray within the interposed optical system and thus the stray radiation of same optical system which, as to be explained and expressed by a formula (7) below, increases with the number of reflections of the infrared ray within the optical system if the latter is of reflection type. In addition, from the results of "Ray Tracing", it can also be found that, in some thermometry systems, most infrared rays received by the sensor come from the target, while in other thermometry systems, most infrared rays received by the sensor come from the surrounding rather than from the target per se. The aforementioned "system FOV" of a thermometry system is defined roughly as the ratio of infrared radiation (or infrared ray) coming from the surrounding among the total infrared radiation (or infrared ray) received by the sensor. Since the surrounding (such as an ear canal) of a target (such as a tympanic membrane) usually have temperatures somewhat different from that of the target (the difference can be as high as 4° F.), the "system FOV" of a thermometry system will affect accuracy in the measurement of target temperature. Accordingly, in the measurement of target temperature, high accuracy can be obtained only if the thermometry system has a very narrow "system FOV".

In U.S. Pat. No. 4,797,840 entitled "Infrared Electronic Thermometer and Method for Measuring Temperature" is disclosed a waveguide, acting as the above-described interposed optical system, which is formed by a straight tube having homogenous diameter throughout its full length. Hereafter, this straight tube is sometimes referred to as "simple straight tube". FIG. 1A shows an actual situation in using such a waveguide 1. The waveguide 1 is interposed between an infrared sensor 2 and a tympanic membrane (the target) 0 is to be temperature measured, and a shutter 5, necessary only for transient response sensors and capable of moving upward and downward under control, is provided between the sensor 2 and the waveguide 1 for optionally opening or closing the passage of infrared rays through the waveguide 1. As shown in FIG. 1B, from the result of "Ray Tracing" with respect to this thermometry system, two facts can be easily found. First, the number of reflections for most infrared rays are larger than 2. Second, among the total infrared rays received by the sensor, a considerable part of infrared rays originate from the surrounding 3 of the tympanic membrane 0. Namely, this thermometry system has a wide "system FOV". Consequently, this thermometry system meets neither requirement (1) nor requirement (2), as described above, for accurate infrared radiation thermometry. Besides, despite that stray radiation which increases with the reflection number of infrared rays is not negligible, U.S. Pat. No. 4,797,840 fails to properly evaluate the effect of stray radiation. Hence, it does not meet the above requirement (3) either.

U.S. Pat. No. 5,024,533 proposes to add an extra temperature sensor at the waveguide so as to take the temperature of the waveguide for evaluating the effect of stray radiation due to temperature rise of the waveguide. However, the provision of an extra temperature sensor will inevitably increase the cost.

Next, U.S. Pat. No. 5,368,038 discloses a waveguide formed by a IR(infrared radiation) transmissive refractive rod. FIGS. 2, 3 and 4 show the construction and the situation of "Ray Tracing" with respect to such a refractive rod waveguide having a flat, convex, and concave end portion respectively. The results of "Ray Tracing" shows that each of the thermometry systems including these refractive rod waveguides have a rather wide system FOV and, thus, does not meet the above requirement (2). Besides, the IR transmissive material forming this type of waveguide with high IR transmissivity is quite expensive, which increases the cost of the whole thermometry system.

To facilitate subsequent description, a terminology hereinafter referred to as "sensor FOV" is also introduced here. The "sensor FOV" of a sensor is usually defined as "Half Magnitude Half angle" (HMHA) The detecting method of the FOV which is now described with reference to FIGS. 9A and 9B. FIG. 9A shows the way of detecting the "sensor FOV" of a sensor, and FIG. 9B shows a detecting result. As shown in FIG. 9A, during the "HMHA" detecting procedure, a target T is operated to move around an infrared sensor N from a position coincident to the normal line N of the sensor N to the left side or the right side with the distance between the target T and the sensor N being kept constant, and the position of the moving target T can be expressed by an angle $\theta$ between the normal line N and a line L connecting the target T and the center of the sensor N. The magnitude M of sensor response with respect to infrared radiation coming from the target T at various positions and received by the sensor N is detected and recorded as a function $M(\theta)$ of $\theta$. Then, the detecting result, namely the function $M(\theta)$ is plotted in FIG. 9B by use of polar coordinate system. The detected magnitude M of sensor response at the position where $\theta=0°$ is designated as $M_0$. At a particular position where the detected magnitude $M_h=(½) M_0$, its position is designated as $\theta_h$. This particular angle $\theta_h$ is defined as the "sensor FOV" of the sensor N. When the sensor N is used in a thermometry system together with a waveguide as described above, the effective "sensor FOV" may be restricted by the relative location and size of the waveguide. As shown in FIG. 9C, if the angle $\theta_W$ between the normal line N of the sensor N and a line I connecting the exit of the waveguide W and the sensor N, is smaller than $\theta_h$, then the effective "sensor FOV" of the sensor N is reduced to $\theta_W$, instead of $\theta_h$.

U.S. Pat. No. 5,522,262 proposes a method to narrow the "system FOV" of a thermometry system at the sacrifice of narrowing its "sensor FOV". In specific, the "sensor FOV" is narrowed by placing, in front of the sensor, a window member including a small infrared window for passing infrared radiation and an infrared shielding area. This design greatly reduces radiation power capable of reaching the sensor. In this patent, it is recognized that this design will decrease the gain of the sensor, and is undesirable with respect to signal/noise ratio if the angle of field of view (namely the infrared window) is too narrow.

SUMMARY OF THE INVENTION

In view of the above-described drawbacks of prior art, the primary object of this invention is to provide an improved waveguide for tympanic thermometer, in which the reflection number of incident infrared ray and thus the stray radiation can be reduced. Consequently, the above requirement (1) for accurate infrared radiation thermometry can be better met as compared with straight tubular waveguide disclosed in U.S. Pat. No. 4,797,840.

Another object of this invention is to provide an improved waveguide for tympanic thermometer, which has narrower system FOV so as to better meet the above requirement (2) for accurate infrared radiation thermometry as compared with in U.S. Pat. Nos. 4,797,840 and 5,368,038.

Yet another object of this invention is to provide an improved waveguide for tympanic thermometer, which allows a certain extent of thermal non-equilibrium between the waveguide and the sensor.

Yet another object of this invention is to provide an improved waveguide for tympanic thermometer wherein the shutter cooperating with the waveguide requires a smaller stroke and moving speed. Consequently, the shutter mechanism and thus the whole thermometer can be more compact, and microphonic noise resulted from vibration due to movement of the shutter may be reduced.

Yet another object of this invention is to provide an improved waveguide for tympanic thermometer, by which higher irradiance on sensor and thus higher S/N Ratio may be obtained.

In order to achieve the above objects, this invention provides a waveguide for tympanic thermometer, formed by an elongate hollow member having two open ends, the waveguide having a highly reflective inner surface of a substantially ellipsoidal shape truncated at both ends along long axis direction, and the waveguide being interposed between a tympanic membrane of which the temperature is to be measured and a infrared radiation sensor so as to guide the infrared radiation from the tympanic membrane to the sensor.

In addition, this invention provides a waveguide for tympanic thermometer, formed by an elongate hollow member and having a highly reflective inner surface. The waveguide is interposed between a tympanic membrane of which the temperature is to be measured and a infrared radiation sensor No as to guide the infrared radiation from the tympanic membrane to the sensor. The waveguide includes an end portion having a gradually reduced inner diameter toward the side of sensor. The gradually reduced end portion may be of a truncated half ellipsoidal shape. Besides, the gradually reduced end portion may have a length between about 1/10 to about 1/3 of the total length of the waveguide.

In addition, this invention provides a waveguide for tympanic thermometer, formed by an elongate hollow member having highly reflective inner surface and being interposed between a tympanic membrane of which the temperature is to be measured and a infrared radiation sensor No as to guide the infrared radiation from the tympanic membrane to the sensor. This waveguide is characterized by further comprising a separate hollow member which has a gradually reduced inner diameter toward the side of sensor, and which is aligned with the elongate hollow member and located adjacent to the elongate hollow member at its larger end when in use.

BRIEF DESCRIPTION OF THE DRAWINGS

In order that the invention be more fully comprehended, it will now be described, by way of example, with reference to the accompanying drawings, in which:

FIG. 9C is a view showing the situation in which the effective "sensor FOV" of a sensor is restricted by the design of the waveguide cooperating with the sensor;

DETAILED DESCRIPTION OF THE PREFERRED EMBODIMENTS

Figure 5A:
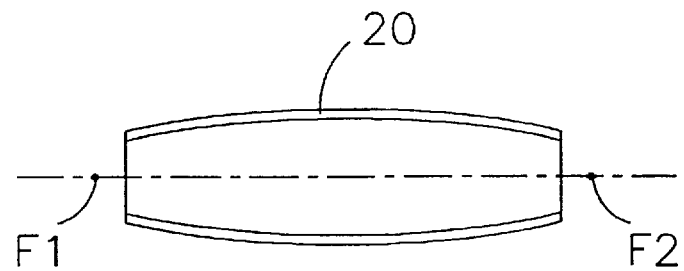
FIG. 5A is a view schematically showing the construction of a waveguide in accordance with the first embodiment of this invention.
Figure 5B:
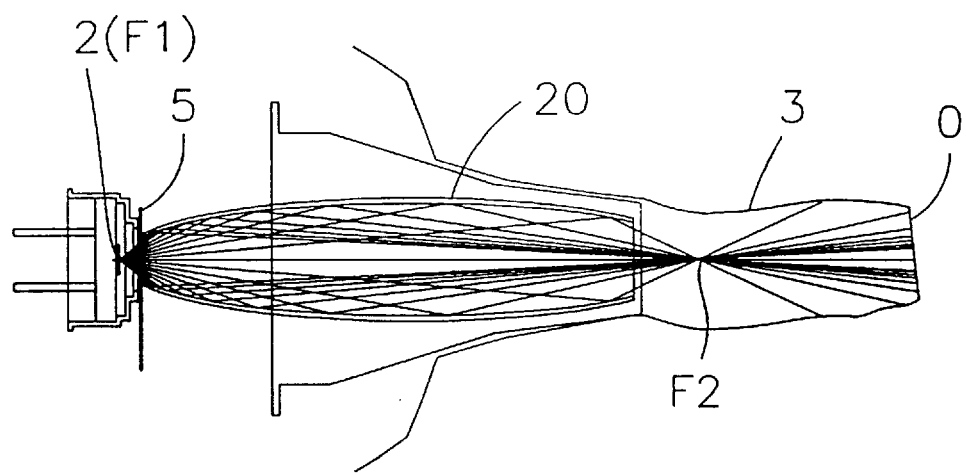
FIG. 5B is a view showing the result of "Ray Tracing" with respect to the waveguide of FIG. 5A.

FIG. 5A is a view schematically showing the construction of a waveguide in accordance with the first embodiment of this invention, and FIG. 5B is a view showing the result of "Ray Tracing" with respect to the waveguide of FIG. 5A.

The construction of the wave guide 20 in accordance with the first embodiment of this invention will now be described by referring to FIG. 5A. This waveguide 20 is formed by an elongate hollow member having two open ends. It has a highly reflective inner surface and a substantially ellipsoidal shape tuncated at both ends along its long axis direction, with the two focal points F1 and F2 of the ellipsoidal shape being located outside of the waveguide 20. When in use, the waveguide 20 together with other comprising parts of an infrared thermometer such as an infrared sensor 2 etc. is put into a human ear as shown in FIG. 5B. The sensor is located near a focal point F1. From the result of "Ray Tracing" with respect to the wave guide as shown in FIG. 5B, it can be found that most infrared rays received by the sensor 2 originate from the target—tympanic membrane 3, and that all incident rays are reflected by the waveguide 20 no more than one time. Namely, the reflection number is 0 or 1 by use of this type of waveguide.

Figure 6A:
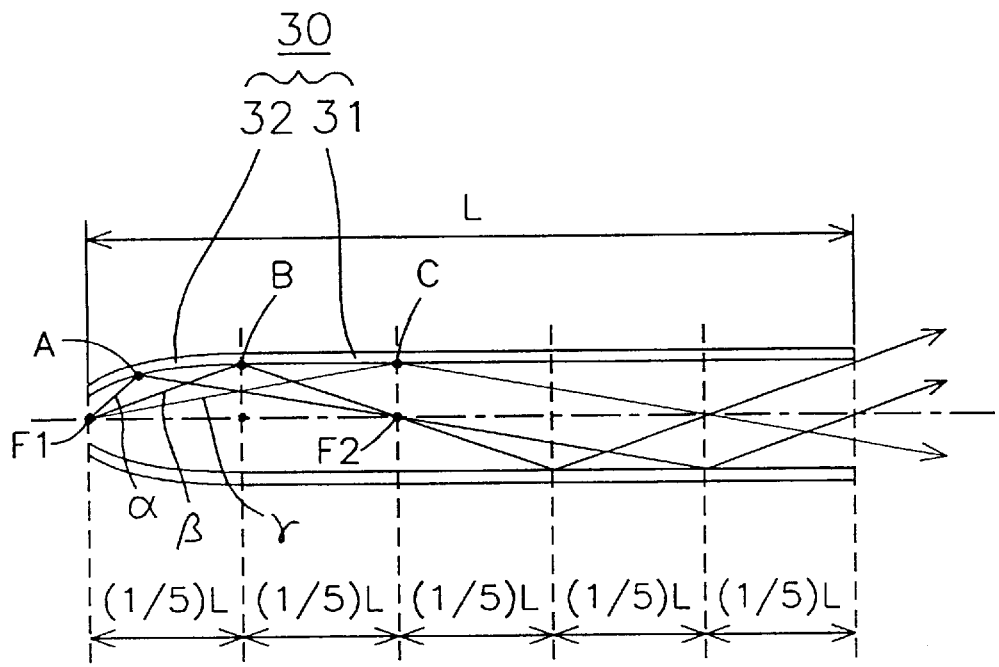
FIG. 6A is an enlarged view schematically showing the construction of a waveguide in accordance with the second embodiment of this invention.
Figure 6B:
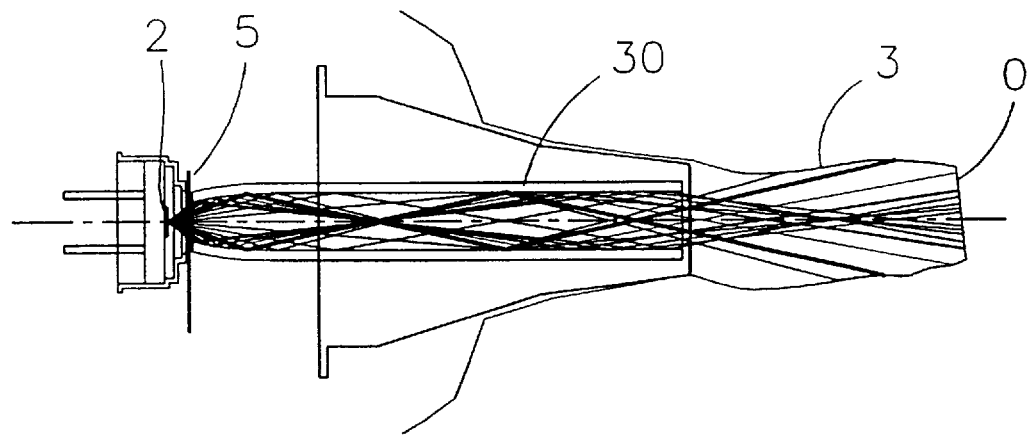
FIG. 6B is a view showing the result of "Ray Tracing" with respect to the waveguide of FIG. 6A.

Next, the construction of a wave guide 30 according to the second embodiment of this invention is described by referring to FIG. 6A. This waveguide 30 is an elongate hollow member having a highly reflective inner surface. It has a total length L including a first straight tubular segment 31 having homogenous diameter and having a length of about ⅖ L, and a second segment 32, integrally formed with the first segment 31, having a truncated half ellipsoidal shape and having a length of about ⅕ L. The second segment 32 has two focal points F1 and F2 which are located, respectively, at the left end and at a position spaced from the left end by ⅖ L. If an infrared sensor 2 (see also FIG. 6B) is provided at the first focal point F1 of the waveguide 30, and "Ray Tracing" is performed with respect to three typical infrared rays α, β and γ which, before reaching the infrared sensor (at focal point F1), are reflected by the inner surface of the waveguide at positions A, B and C located, respectively, at ⅒ L (within the second segment 32), ⅕ L (at the junction of segments 31 and 32), and ⅖ L from the left end. The situation how all the infrared rays are reflected within the waveguide 30 can be understood by reversely tracing the three infrared rays α, β and γ. Namely, consider each ray α, β and γ emits from the focal point F1, passes the wave guide 30 and finally exits the right end of the waveguide 30. Both rays α and β are first reflected by segment 32, then reflected again by segment 31 after passing through the focal point F2 due to the physical property of an ellipsoid, and finally exits the waveguide 30 from its right end. All rays (such as Ray γ) emitting from the focal point F1 and first reflected by segment 31, will be further reflected only one time or zero time before leaving the waveguide 30. Consequently, we conclude that all infrared rays emitting from the focal point F1 are reflected no more than two times before leaving the waveguide 30, or reversely, all infrared originating from the target and its surrounding on the right side of the wave guide 30 (see FIG. 6B) and received by the sensor 2 provided at focal point F1 are reflected no more than two times within the waveguide 30.

To clear the advantages of the afore-described waveguides according to the first and the second embodiments of this invention over prior art, some ways for comparing performance of waveguides of reflection type are now introduced here.

Figure 10A:
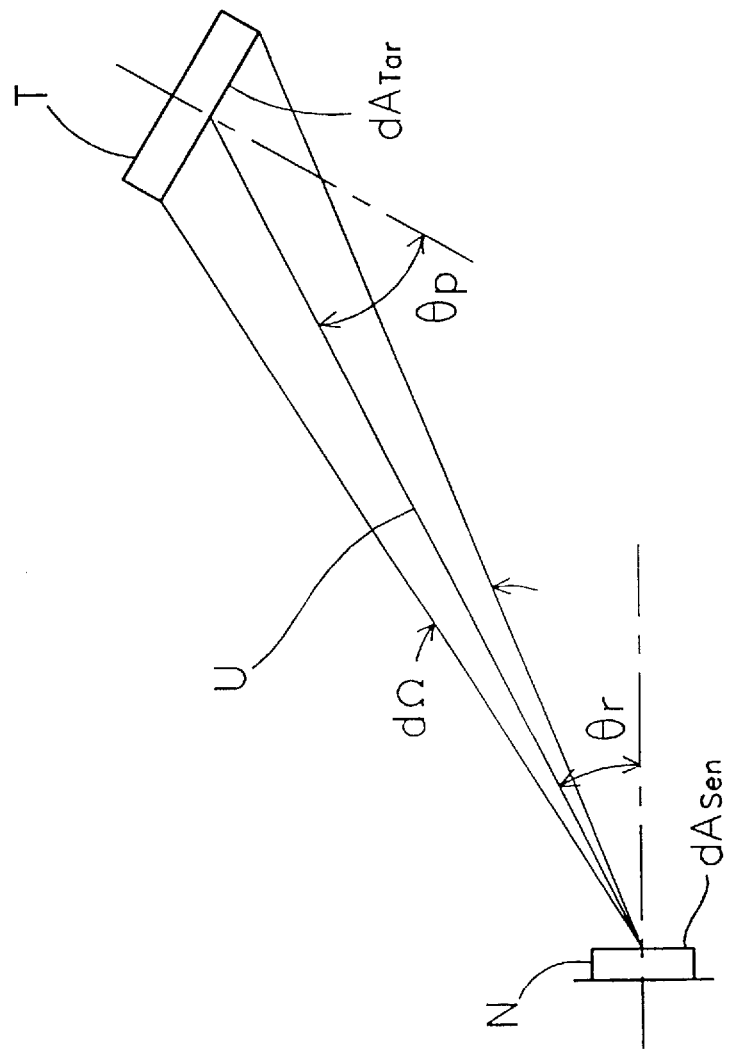
FIG. 10A is a view for analyzing incident power on the sensor from a target.

First, referring to FIG. 10A, incident power on the sensor N from a target T with radiance RA may be expressed as: (Reference: Thermal Radiation Heat Transfer Robert Siegel, John R. Howell p.19)

$$dE = RA \cdot dAtar \cdot \cos(\theta p) \cdot dAsen \cdot \frac{\cos(\theta r)}{S^2}$$

Where,
| | |
|---|---|
| dAtar | area of a first small portion on the target T |
| dAsen | area of a second small portion on the sensor N |
| dE | incident power on a first small portion in the target T |
| RA | radiance of the target T |
| U | a straight line connecting a first small portion on the target T and a second small portion on the sensor N |
| S | distance between the sensor N and the target T (i.e. length of the connecting line U) |
| θp | angle between the normal line to the first small portion and the connecting line U |
| θr | angle between the normal line to the sensor N and the connecting line U (or the incident ray) |

Dividing both sides of the above formula by dAsen, we get $$\frac{dE}{dAsen} = RA \cdot \cos(\theta r) \cdot \frac{\cos(\theta p) \cdot dAtar}{S^2}$$

$$d\Phi = RA \cdot \cos(\theta r) \cdot d\Omega$$

Where
| | |
|---|---|
| $d\Phi$ (= dE/dAsen) | irradiance on the sensor N |
| $d\Omega$ (= $\cos(\theta p) \cdot dAtar/S^2$) | a small solid angle, corresponding to dAtar, subtended around the sensor N |

Substituting $RA = \sigma T^4/\pi$ (from Stefan-Boltzmann law) into the above formula, we get $$d\Phi = \frac{\sigma \cdot T^4}{\pi} \cdot \cos(\theta r) \cdot d\Omega$$

Further, the above formula can be changed into:

$$d\Phi = kc \cdot T^4$$

where $$kc = \frac{\sigma}{\pi} \cos(\theta r) \cdot d\Omega = \sigma 1 \cdot \cos(\theta r) \cdot d\Omega \quad (K)$$

where σ is Stefan-Boltzmann Constant, and $$\sigma 1 = \frac{\sigma}{\pi}$$

Figure 10B:
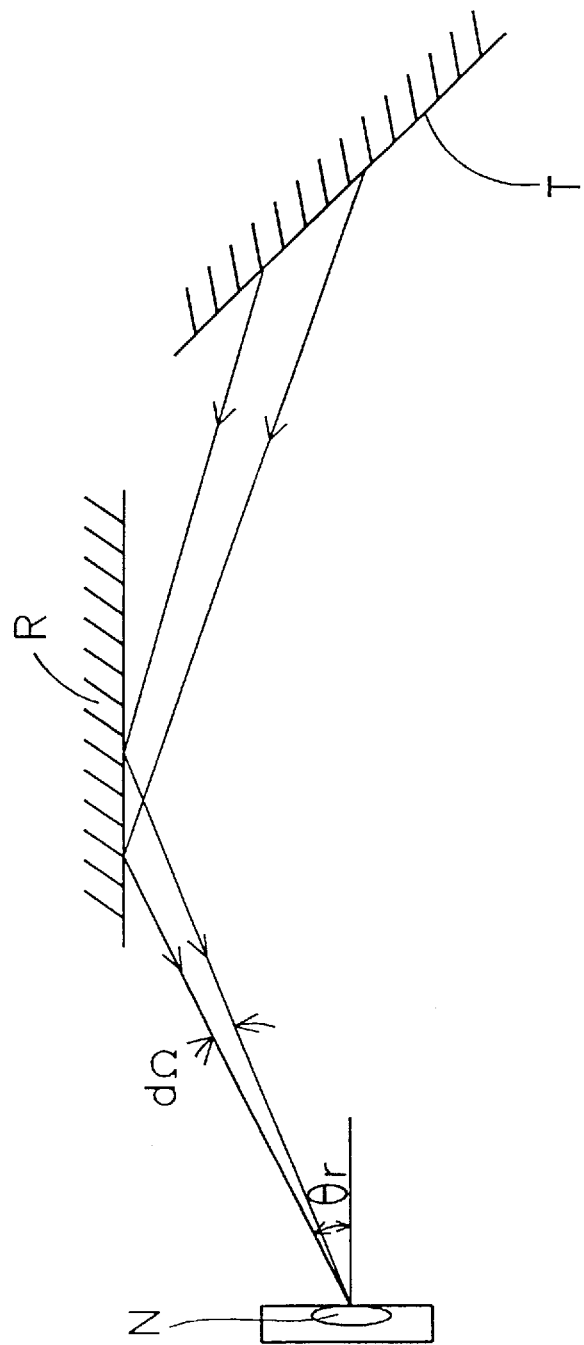
FIG. 10B is a view for analyzing the irradiance at the center of an infrared sensor and stray radiation if an infrared ray is first reflected by a reflector before reaching the sensor.

Next, refer to FIG. 10B, which is a view for analyzing the irradiance at the center of an infrared sensor N and stray radiation in the situation when an infrared ray coming from the target T is first reflected by a reflector R (such as an interposed waveguide) before reaching the sensor N.

From Stefan-Boltzmann law, and taking into consideration the emissivity of each infrared source (the target, the waveguide and the sensor), we get the irradiance including the signal radiation, stray radiation and also outgoing radiation from the sensor under a "One Reflection" condition as follows:

(1) Signal—Infrared radiation from target T to sensor N $$d\Phi sig = kc \cdot Ttar^4 \cdot Rw^1 \cdot \epsilon s$$

(2) Stray Radiation—Infrared radiation from the reflector R (wave guide)

$$d\Phi sty = kc \cdot Twg^4 \cdot \epsilon s \cdot \epsilon w$$

(3) Outgoing radiation from the Sensor N $$d\Phi out = kc \cdot Tsen^4 \epsilon s$$

where,

| | |
|---|---|
| $T_{tar}$ | temperature of the target T |
| $T_{sen}$ | temperature of the sensor N |
| $T_{wg}$ | temperature of the waveguide |
| Ω | solid angle subtended around the the sensor N |
| dφ | Irradiance on the sensor N within a small solid angle dΩ |
| $d\phi_{sig}$ | Irradiance produced by infrared radiation from the target to the sensor |
| $d\phi_{sty}$ | Irradiance produced by infrared radiation from the reflector to the sensor |
| $d\phi_{out}$ | Irradiance produced by infrared radiation outgoing from the sensor |
| εt | emissivity of the target |
| εs | emissivity of the sensor |
| εw | emissivity of the waveguide |
| Rw≡1−εw | Reflectivity of the reflector (waveguide) |
| θrx | Field of view (FOV) of the Sensor (not the system) |

Further, we obtain the signal, stray radiation and also outgoing radiation from the sensor under a "Two Reflection" condition as follows:

(4) Signal—Infrared radiation from the target T to Sensor:

$$d\Phi sig = kc \cdot Ttar^4 \cdot Rw^2 \cdot \epsilon s$$

(5) Stray Radiation—Infrared radiation from the reflector R (waveguide)

$$d\Phi sty = kc \cdot Twg^4 \cdot \epsilon s \cdot \epsilon w \cdot (1 + Rw^1)$$

In addition, we get the signal, stray radiation and also outgoing radiation from the sensor under an "N Reflection" condition, which is the general case, as follows:

(6) Signal—Infrared radiation from target T to sensor N $$d\Phi sig = kc \cdot Ttar^4 \cdot Rw^N \cdot \epsilon s \quad (6)$$

(7) Stray Radiation—Infrared radiation from the reflector R (waveguide)

$$d\Phi sty = kc \cdot Twg^4 \cdot \epsilon s \cdot \epsilon w \cdot (1 + Rw + \ldots + Rw^{N-1}) \quad (7)$$

Figure 10C:
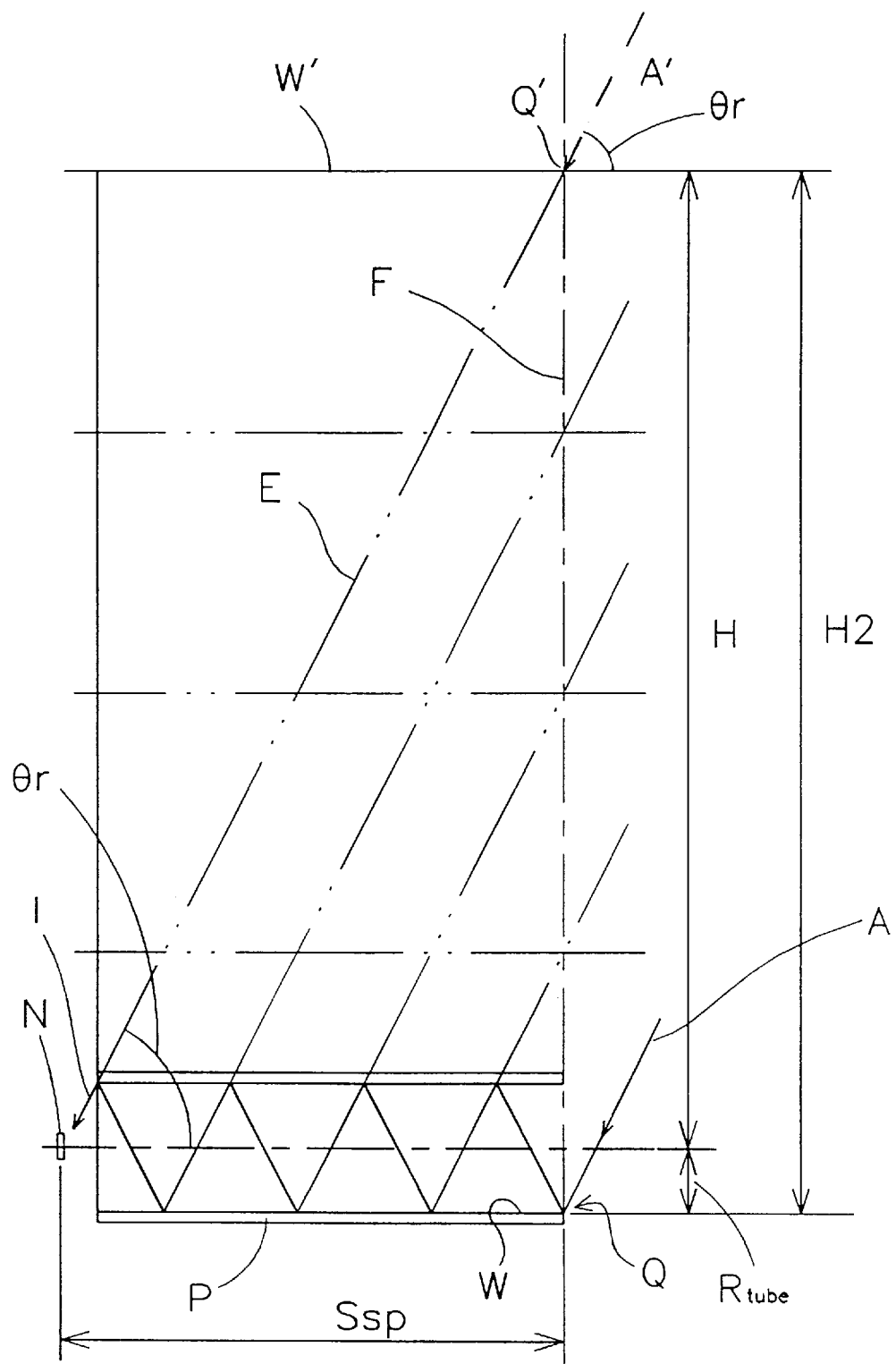
FIG. 10C is a view for analyzing the reflection number of an infrared ray within a prior waveguide formed by a "simple straight tube"

Next, the reflection number of an infrared ray within the prior waveguide formed by a "simple straight tube" (U.S. Pat. No. 4,797,840) can be obtained by referring to FIG. 10C. Assume that an infrared ray A enters a tube P from its right end and finally reaches a sensor N located near the left end of the tube P after being reflected several times by the tube wall W. If we extend the incident ray I, coming from the last reflection point, backward to form a phantom line E, and also draw another phantom line F perpendicular to the tube wall at the first reflection point Q. From the intersecting point Q' of lines E and F, draw a line W' parallel to the tube wall W. Considering the line W' and the point Q, respectively, as the images of the tube wall W and the first reflection point Q, we can imagine an imaginary infrared ray A' first passes through point Q' and then directly enters the sensor N, which is similar to the situation of the propagation of the actual infrared ray A within the tube P. Consequently, the reflection number can be expressed as follows:

$$Nftube(\theta r)=floor(H2/2Rtube)$$

$$H2=H+Rtube$$

$$H=\tan(\theta r)Ssp$$

and, finally we get $$Nftube(\theta r) = floor\left(\frac{\tan(\theta r) \cdot Ssp + Rtube}{2 \cdot Rtube}\right) \quad (8)$$

where
Nftube(θr)   the reflection number of an infrared ray
θr           angle between the incident ray I and the center line of the tube P
Ssp          Distance from the sensor N to the distal end of the waveguide
Rtube        radius of the tube P
floor        a function rounding off the number in the bracket into an integral number On the other hand, the reflection number of an infrared ray within the waveguides according to the first and second embodiments expressed as follows:

$$Nf(\theta r, max)=max \text{ If } Nftube(\theta r) > max$$

$$Nf(\theta r, max)=Nftube(\theta r) \text{ If } Nftube(\theta r) \leq max \quad (9)$$

where, max≡1(for the first embodiment), or max≡2(for the second embodiment)

Nftube(θr)≡reflection number obtained from formula (8)

Hence, the reflection number of a waveguide depends on both θr and the design (type) of the waveguide—the first embodiment, the second embodiment or the prior simple tubular type. Namely, the reflection number may, in general, be expressed as Nftube=Nf(θr, d) where "d" means "design" (type) of the waveguide. In each case of the first embodiment, the second embodiment or the prior simple tubular type, the function Nf(θr, d) for the reflection number of the waveguide may be expressed as Nf(θr, E1), Nf(θr, E2) or Nf(θr, Pr), respectively.

Figure 1A:
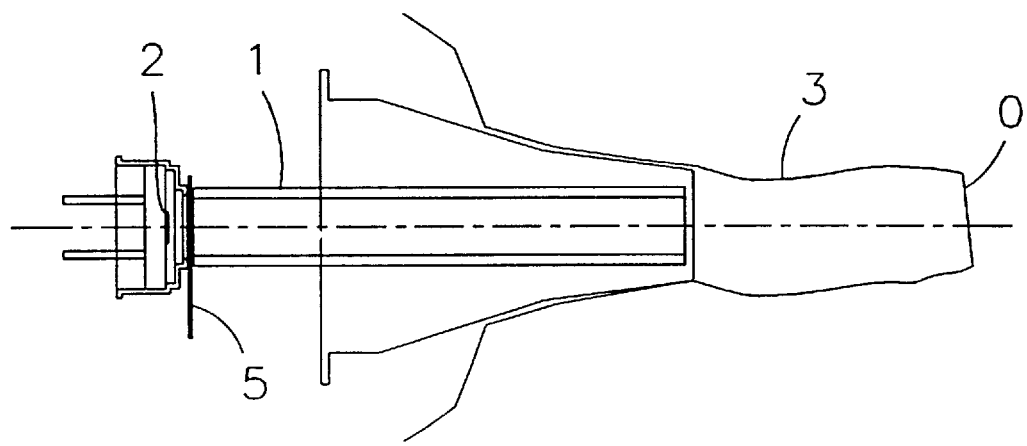
FIG. 1A is a view schematically showing the construction of a prior waveguide formed by a simple straight tube as disclosed in U.S. Pat. No. 4,797,840.
Figure 1B:
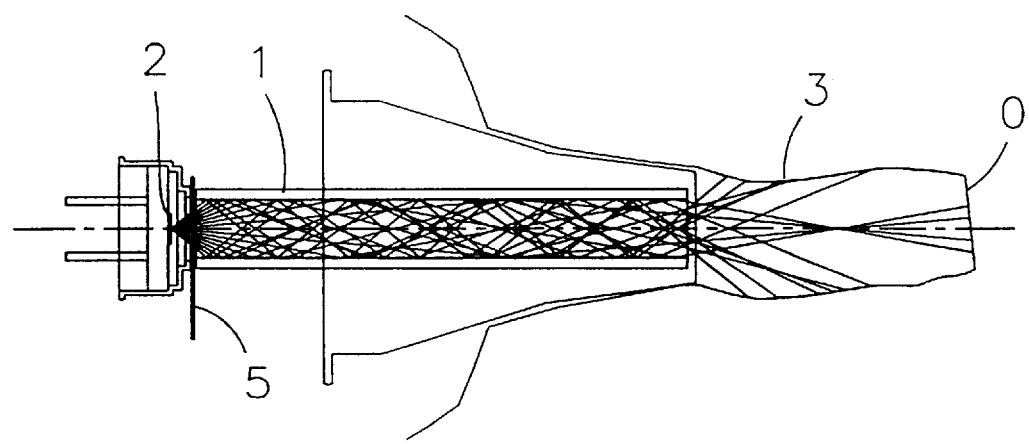
FIG. 1B is a view showing the result of "Ray Tracing" with respect to the waveguide of FIG. 1A.
Figure 2:
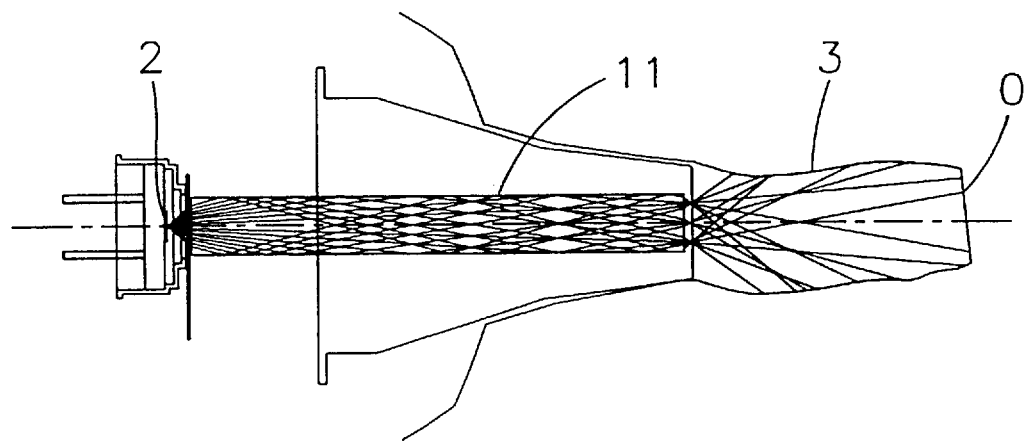
FIG. 2 is a view showing the result of "Ray Tracing" with respect to a waveguide formed by a refractive rod with flat end as disclosed in U.S. Pat. No. 5,368,038.
Figure 3:
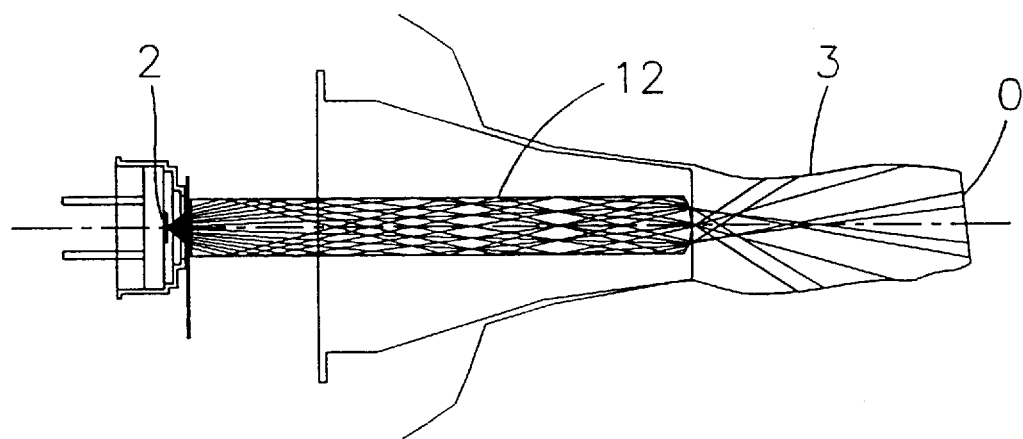
FIG. 3 is a view showing the result of "Ray Tracing" with respect to a waveguide formed by a refractive rod with convex end as disclosed in U.S. Pat. No. 5,368,038.
Figure 4:
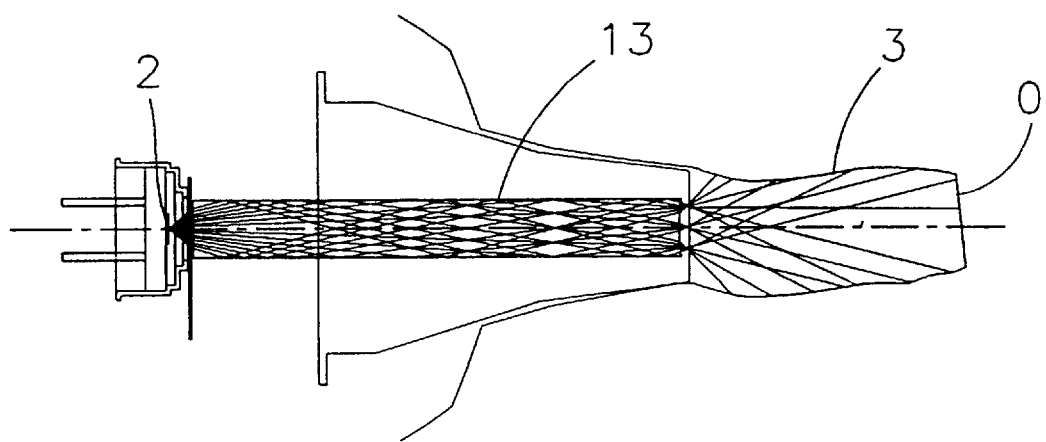
FIG. 4 is a view showing the result of "Ray Tracing" with respect to a waveguide formed by a refractive rod with concave end as disclosed in U.S. Pat. No. 5,368,038.
Figure 11:
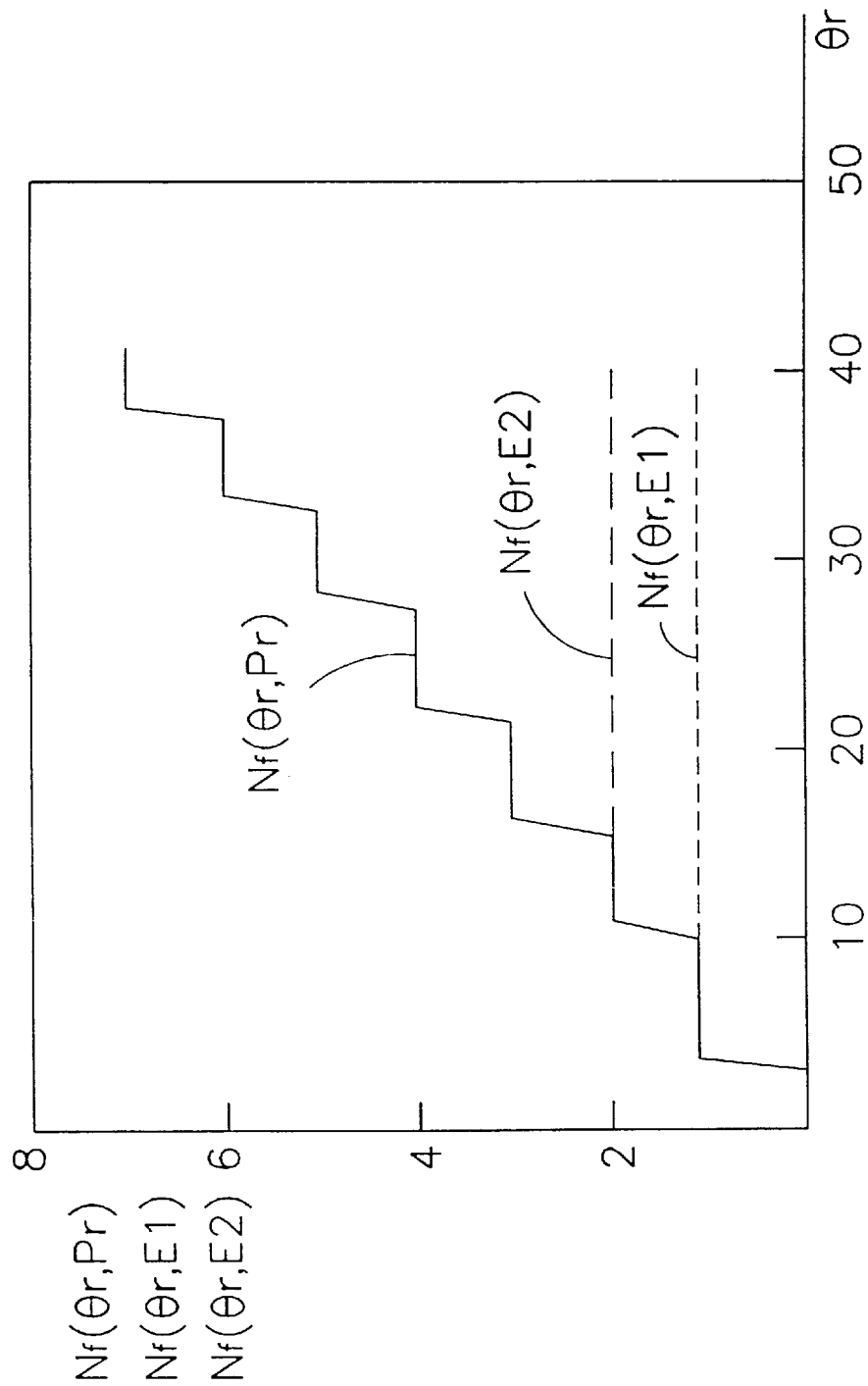
FIG. 11 compares the reflection numbers of an infrared ray in the waveguides illustrated, respectively, in FIGS. 1B, 5A and 6A, as the function of corresponding incident angles on the sensor.

The reflection numbers calculated from formulas (8), (9) for the prior waveguide and also for the first and the second embodiments are shown as functions of θr in FIG. 11. The reflection number for the prior waveguide Nf(θr, Pr) is expressed as a step-shaped graph, while those for the first embodiment Nf(θr, E1) and the second embodiment Nf(θr, E2) are horizontal lines, which express the reflection number Nf(θr, E1)=1 and Nf(θr, E2)=2, respectively. The same result has also been obtained by "Ray Tracing" (see FIGS. 1B, 5B and 6B).

Next, combine the above Nf(θr, d) and the value fo kc as expressed in the above formula (K) into formulas(6), (7) We have:

(10) Signal—Infrared radiation from target T to sensor N $$d\Phi sig(\theta r,d,Ttar)=\sigma 1 \cdot \cos(\theta r) \cdot \epsilon s \cdot Ttar^4 \cdot Rw^{Nf(\theta r,d)} \cdot d\Omega$$

(11) Stray Radiation—Infrared radiation from the reflector R (waveguide)

$$d\Phi sty(\theta r,d,Twgd)=\sigma 1 \cdot \cos(\theta r) \cdot \epsilon w \cdot \epsilon s \cdot (Tsen+Twgd)^4 \cdot$$

$$\sum_{n=1}^{Nf(\theta r,d)} Rw^{n-1} \cdot d\Omega$$

where Twgd=Twg−Tsen

(12) Outgoing radiation from Sensor $$d\Phi out(\theta r,d)=\sigma 1 \cdot \cos(\theta r) \cdot \epsilon s \cdot Tsen^{4} \cdot d\Omega$$

Now we integrate these equations with respect to a small solid angle dW throughout the whole sensor FOV to get total heat transfer (FI) for a) signal radiation b) stray radiation, c) Outgoing radiation, and d) Net radiation.

$$\Phi Isig(\theta rx,d,Ttar)=\int d\Phi sig(\theta r,d,Twgd) \quad (13)$$

$$\Phi Isig(\theta rx,d,Ttar)=\int \sigma 1 \cdot \cos(\theta r) \cdot \epsilon s \cdot Ttar^4 \cdot Rw^{Nf(\theta r,d)} \cdot d\Omega$$

Substituting dΩ=2πsin(θr)dθr into formula (13), we get $$\Phi Isig(\theta rx,d,Ttar) = \quad (14)$$

$$2\pi \int_0^{\theta rx} \sigma 1 \cdot \cos(\theta r) \cdot \epsilon s \cdot Ttar^4 \cdot Rw^{Nf(\theta r,d)} \cdot \sin(\theta r) \cdot d\theta r$$

Similarly, we get ΦIsty(θrx, d, Ttar) and ΦIout(θrx, d) as follows:

$$\Phi Isty(\theta rx,d,Twgd) = 2\pi \int_{\theta o}^{\theta rx} s1 \cdot \cos(\theta r) \cdot \epsilon w \cdot \epsilon s \cdot (Tsen+Twgd)^4 \cdot \quad (15)$$

$$\sum_{n=1}^{Nf(\theta r,d)} Rw^{n-1} \cdot \sin(\theta r) \cdot d\theta r$$

$$\Phi Iout(\theta rx,d) = 2\pi \cdot \int_0^{\theta rx} \sigma 1 \cdot \cos(\theta r) \cdot \epsilon s \cdot Tsen^4 \cdot \sin(\theta r) \cdot d\theta r \quad (16)$$

Also the total heat transfer for net radiation ΦInet(θrx, d, Twgd) can be expressed as:

$$\Phi Inet(\theta rx,d,Twgd)=\Phi Isig(\theta rx,d,Ttar)+\Phi Isty(\theta rx,d,Twgd)-\Phi Iout(\theta rx,d) \quad (17)$$

Those unknowns appearing in the above formulas may be, respectively, assigned proper values as follows:

Ttar≡(37+273.15)·degK
Tsen≡(25+273.15)·degK
Twg=Tsen+Twgd
Twgd≡1.5·degK
εt≡0.99
εs≡0.90

εw≡0.02 suppose the waveguide is made of polished gold
Rw≡1−εw $$\sigma = 5.67 \cdot 10^{-8} \cdot \frac{watt}{m^2 \cdot degK^4}$$

θo: maximum θ for zero reflection

| | |
|---|---|
| Rtube≡1.90 mm | Radius of waveguide |
| Ssp≡33.2 mm | Distance from sensor to the distal end of the waveguide |

Figure 12:
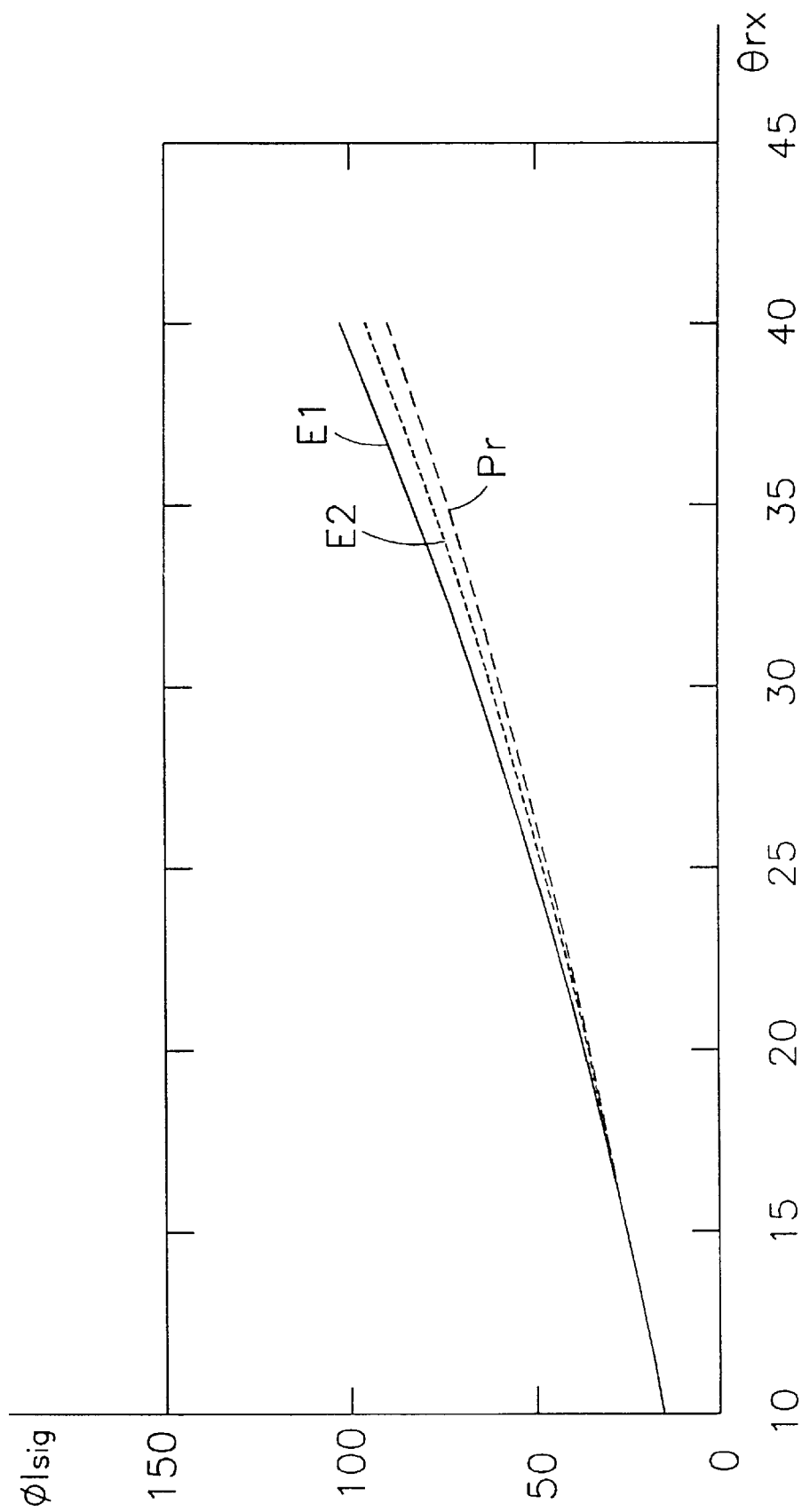
FIG. 12 compares the total signal irradiance from the target as a function of the sensor FOV.
Figure 13:
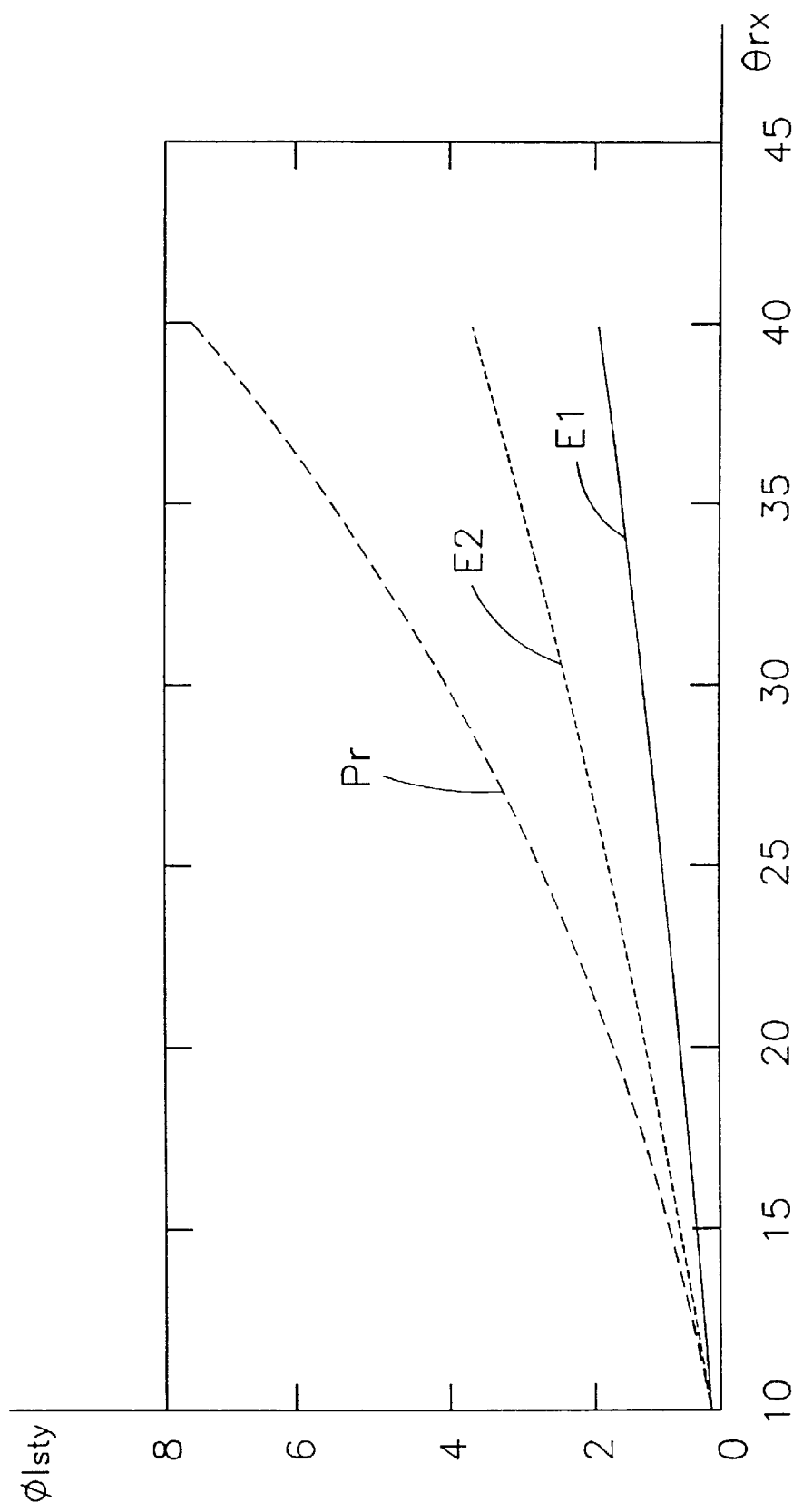
FIG. 13 compares the total stray radiation from the waveguide as a function of the sensor FOV.
Figure 14:
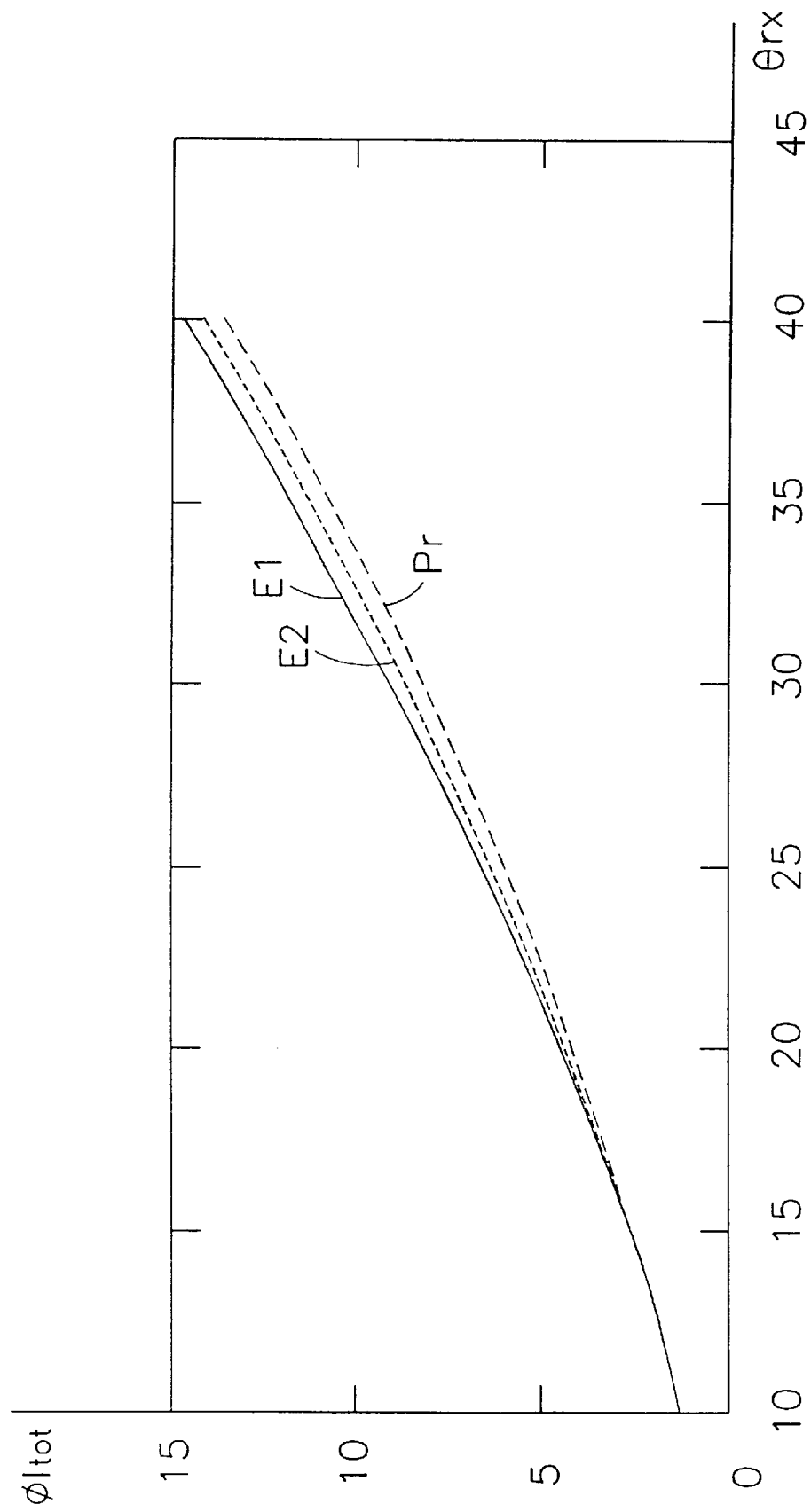
FIG. 14 compares total net irradiance on the sensor as a function of the sensor FOV.

Substituting the above values into the formulas (13), (14) and (16), and performing the integration with respect to the variable θr, we can obtain the results of integration for various θrx's which are shown in FIGS. 12, 13 and 14.

In FIGS. 12, 13 and 14, the solid line graphs E1's express the first embodiment, the thin dotted line graphs E2's express the second embodiment and the thick dotted line graphs Pr's express the prior waveguide. It can be easily found that, judging from ΦIsig(θrx, d, Ttar), ΦIsty(θrx, d, Ttar) and ΦIout(θrx, d), the performance of waveguides according to the first and the second embodiments are better than that of the prior waveguide especially when the sensor FOV θrx is large, and the waveguide according to the first embodiment is the best. Namely, waveguides according to both the first and the second embodiments of this invention provide lower stray radiation and higher irradiance (and thus higher S/N Ratio) on the sensor.

Figure 15:
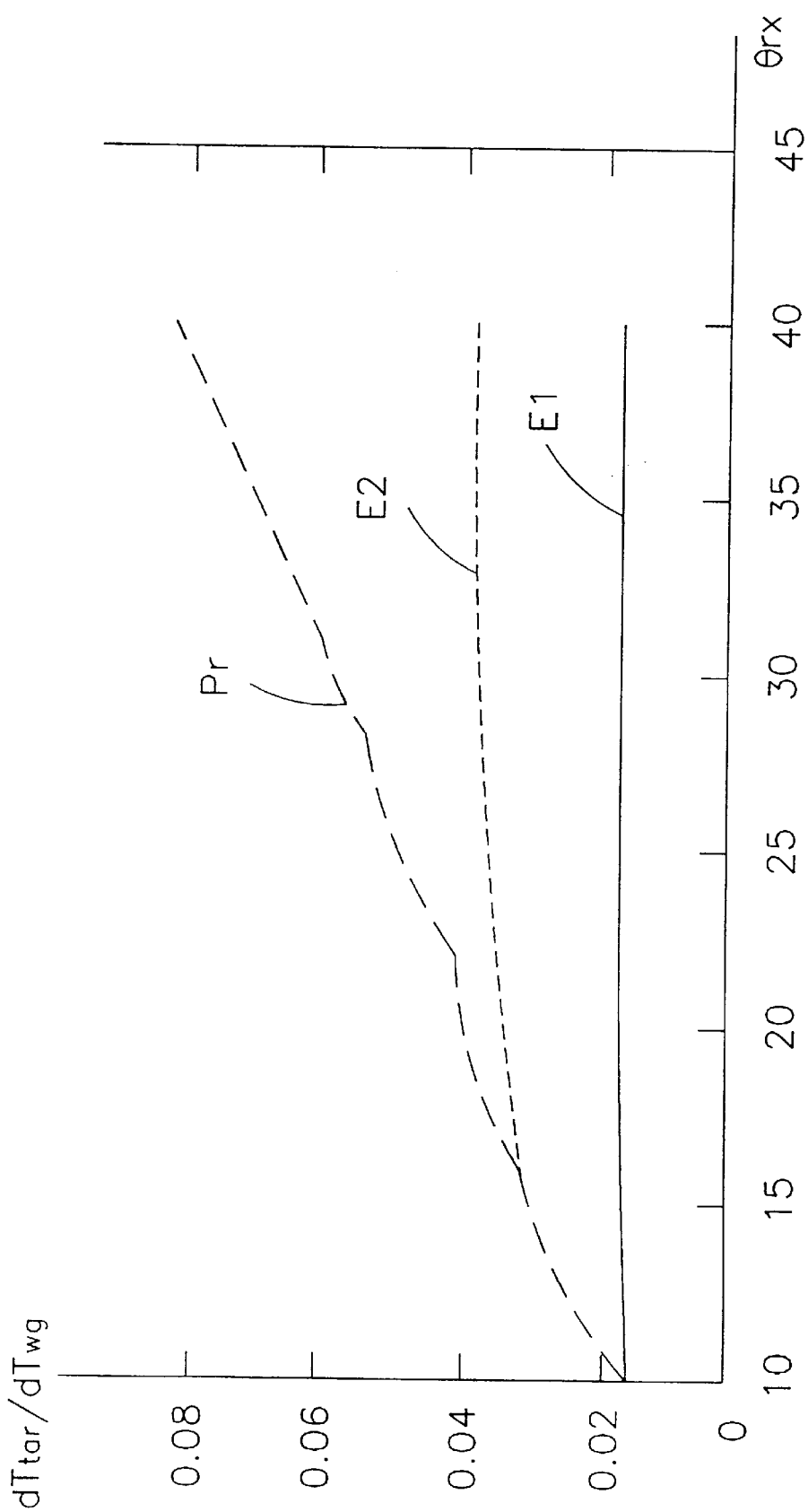
FIG. 15 compares the sensitivity of error in the measured target temperature with respect to the fluctuation in the waveguide temperature as a function of the sensor FOV.

Besides, in order to assess the error of measured target temperature Ttar due to fluctuation of waveguide temperature Twg, the values of dTtar/dTwg are calculated by the following formula (18) at various θrx's for the first and the second embodiments of this invention and also for the prior simple tubular waveguide, and the results are shown in FIG. 15.

$$dTtar/dTwg(\theta rx, d, Twgd, Ttar) = \frac{\frac{d}{dTwgd} \Phi Inet(\theta rx, d, Twgd)}{\frac{d}{dTtar} \Phi Inet(\theta rx, d, Twgd)} \quad (18)$$

In FIG. 15, the calculated result of dTtar/dTwg for the first embodiment is expressed by the solid line graph E1, the result for the second embodiment is expressed by the thin dotted line graph E2, and the result for the prior waveguide is expressed by the thick dotted line graph Pr. It can be easily found from FIG. 15 that the dTtar/dTwg value for the first embodiment substantially keeps constant for all values θrx of FOV. Also the dTtar/dTwg value for the second embodiment, though somewhat larger than the first embodiment, substantially keeps constant for nearly all values θrx of FOV. However, the dTtar/dTwg value for the prior waveguide increases with θrx which results in a considerable error in the measured Ttar when θrx approaches 40°. Consequently, the waveguides according this invention allow a certain extent of temperature rise in Twg and, thus, a certain extent of thermal non-equilibrium between the waveguide and the sensor.

Figure 7:
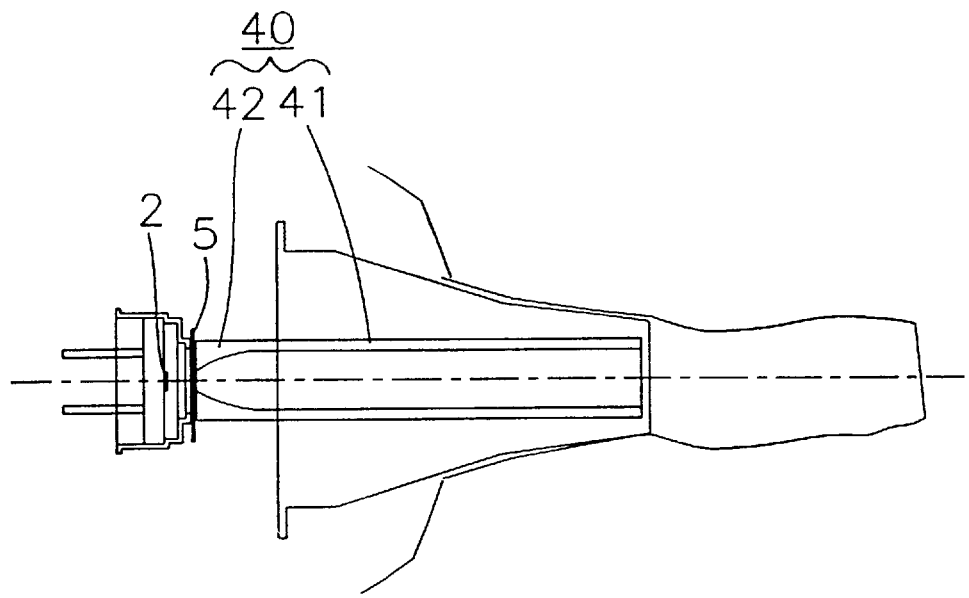
FIG. 7 is a view schematically showing the construction of a waveguide in accordance with the third embodiment of this invention.

FIG. 7 shows the construction of a waveguide 40 according to the third embodiment of this invention. This waveguide 40 includes a first straight tubular segment 41 having homogenous diameter and a second segment 42, integrally formed with the first segment 41, having an inner surface of truncated conic shape which gradually reduces in diameter towards the direction of the sensor 2. The inner surface of this waveguide 40 has a shape quite similar to that of the second embodiment, thus it has similar performance which is superior to the prior simple tubular wave guide as described above.

Each of the three waveguides 20, 30, 40 according to the first, second and third embodiments has, at the one end near the sensor, an exit size which is smaller as compared with the prior waveguide formed by a simple straight tube. Thus, the shutter 5 interposed between the waveguide and the sensor to optionally open or close the passage of infrared rays can be reduced in its stroke and moving speed. Thus microphonic noise partly resulting from the vibration during the movement of the shutter can be greatly reduced as compared with the prior waveguide.

Figure 8:
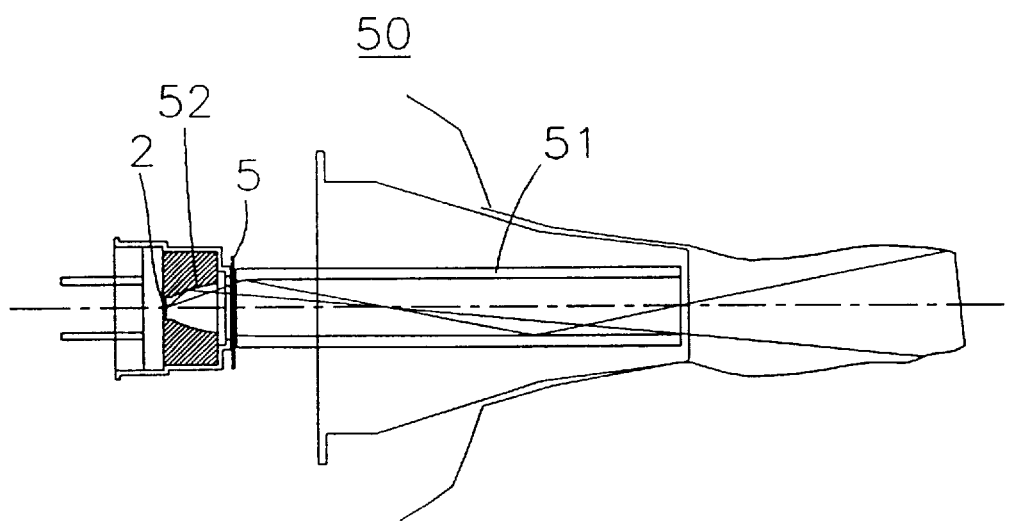
FIG. 8 is an enlarged view schematically showing the construction of a waveguide in accordance with the fourth embodiment of this invention.
Figure 9A:
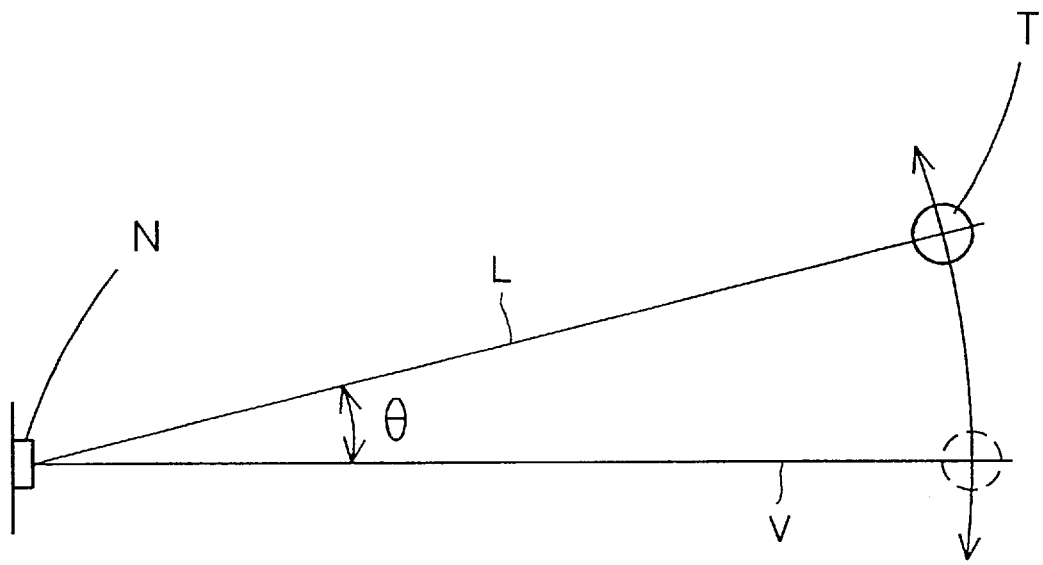
FIG. 9A is a view showing the method of detecting the "sensor FOV" of a sensor.
Figure 9B:
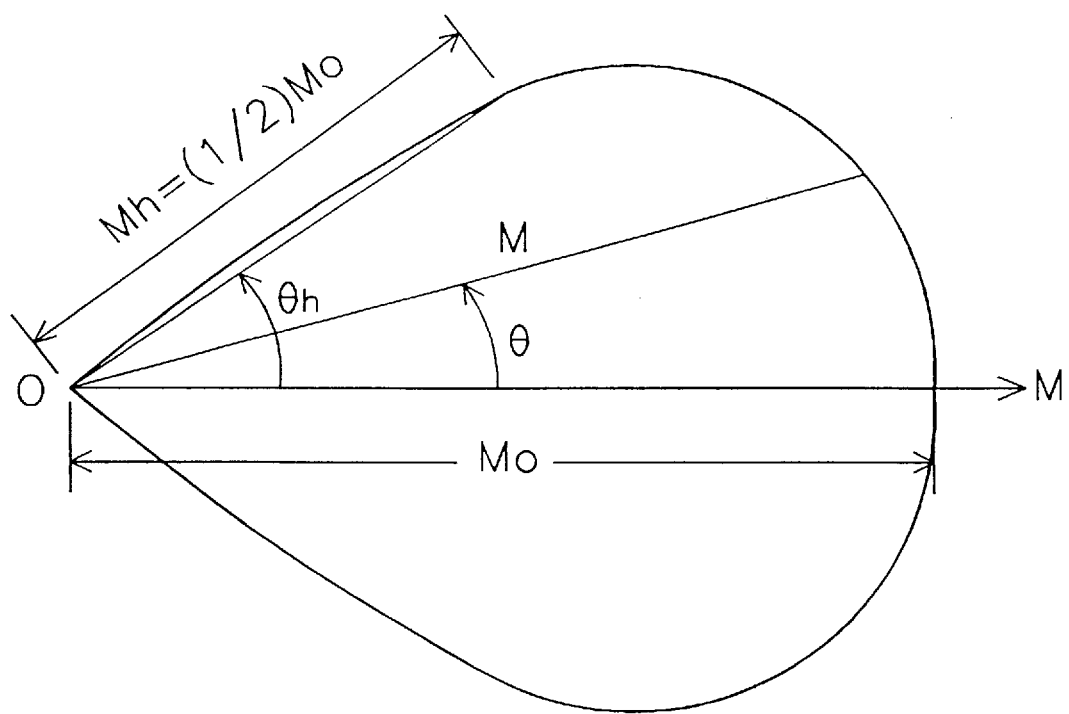
FIG. 9B shows the result obtained by the detecting method of FIG. 9A.

FIG. 8 shows another waveguide 50 according to the fourth embodiment which is the variation of the waveguide 40 according to the third embodiment. This waveguide 50 also includes two segments13 a first straight tubular segment 51 having homogenous diameter and a second segment 52 having an inner surface of truncated conic shape which gradually reduces in diameter towards the direction of the sensor 2. However, the second segment 52 is separately provided with the first segment 51. The second segment 52 is axially aligned with and located adjacent to the first segment 51 at its larger end when in use, with the shutter 5 being interposed therebetween. Thus, when the shutter 5 is opened, the two segments 51 and 52 together constitute a whole waveguide substantially the same, in its construction and performance, as the waveguide 40 of the third embodiment.

Summing up the above, the waveguides according to the above embodiments are capable of achieving the objects of this invention—lower stray radiation, narrower system FOV, allowance of a certain extent of thermal non-equilibrium between the waveguide and the sensor, lower microphonic noise, and higher irradiance on sensor(higher S/N Ratio).

The above description of the preferred embodiments of this invention is intended to be utilized as an illustration of the concept of this invention. The scope of this invention is by no means limited by these embodiments. It is clear that various variations can be made to the system within the spirit and scope of this invention. For example, in the third and fourth embodiments, though the second segment is described to have an inner surface of truncated conic shape, any second segment having a gradually reduced inner diameter toward the side of sensor can be used instead. The scope of this invention shall be defined in the following claims.

What is claimed is:

1. A tympanic thermometer structure, comprising:

an infrared radiation sensor; and a waveguide comprising an elongate hollow member having first and second open ends and having a highly reflective inner surface, the waveguide being coupled at its first end to the infrared sensor, the waveguide and infrared radiation sensor being configured and arranged so that, in use, the waveguide is interposed between a tympanic membrane to be temperature measured and the infrared radiation sensor so as to guide infrared radiation from the tympanic membrane to the sensor; the waveguide having a substantially ellipsoidal shape truncated at both ends along a major axis thereof.

* * * * *